United States Patent [19]

Davis, Jr. et al.

[11] 4,395,865

[45] Aug. 2, 1983

[54] SELF PROPELLED LAWN MOWER

[76] Inventors: Robert D. Davis, Jr., 29564 Orangelawn, Livonia, Mich. 48150; James S. Schucker, 54 Massoit, Clawson, Mich. 48017

[21] Appl. No.: 229,200

[22] Filed: Jan. 28, 1981

[51] Int. Cl.³ .............................................. A01D 35/22
[52] U.S. Cl. ..................... 56/13.3; 56/11.3; 56/11.8; 56/13.6; 56/15.2; 56/320.2; 56/DIG. 22
[58] Field of Search ........... 56/6, 15.2, 15.3, DIG. 22, 56/13.6, 13.3, 13.4, 202, 320.2, 11.3, 11.6, 11.8

[56] References Cited

U.S. PATENT DOCUMENTS

| | | | |
|---|---|---|---|
| 2,114,096 | 4/1938 | Noel | 56/25 |
| 2,134,115 | 10/1938 | Flammang | 56/25 |
| 2,193,712 | 3/1940 | Campbell | 56/238 |
| 2,682,740 | 7/1954 | Miller et al. | 56/6 |
| 2,920,435 | 1/1960 | Vallone | 56/13.3 |
| 2,952,961 | 9/1960 | Engler | 56/25.4 |
| 3,070,938 | 1/1963 | Winget | 56/13.6 |
| 3,080,696 | 3/1963 | Wood | 56/DIG. 22 |
| 3,116,583 | 1/1964 | Mason | 56/6 |
| 3,152,431 | 10/1964 | Ott et al. | 56/25.4 |
| 3,461,654 | 8/1969 | Plamper | 56/DIG. 22 |
| 3,500,619 | 3/1970 | Bacon | 56/13.6 |
| 3,613,336 | 10/1971 | Smith | 56/15.2 |
| 4,114,353 | 9/1978 | Ansbaugh | 56/13.3 |
| 4,317,325 | 3/1982 | Marto | 56/DIG. 22 |

*Primary Examiner*—Jay N. Eskovitz
*Attorney, Agent, or Firm*—James M. Deimen

[57] ABSTRACT

The invention comprises an improved lawn mowing machine for large expanses of grass around apartment complexes, commercial facilities and golf courses. The mower is self propelled with a forward mounted mower deck including a plurality of rotary cutters. The blades or cutters rotate in opposite directions on opposite sides of the deck to bring the grass clippings to a deck mounted central vacuum. The mower blades are driven by a belt drive to eliminate expensive drive shafts and gearboxes. Applicant's 45° twist belt drive geometry provides increased life to the belt over prior art 90° twist belt drive geometries.

The mower deck includes novel side mower wings. A combined clutch and brake mechanism disengages the drive belt to the wing blade spindle and simultaneously brings the blade to a stop within one second when the wing in raised beyond its cutting range. The wing deck is attached to the mower central deck by a depressed hinge substantially close to the elevation of the mower blades. As the mower encounters uneven ground the separation of blade cutting paths is minimized in the movement of the wing blades relative to the central mower deck blades.

The mower deck is equipped with front arm mounted casters which include a simple adjustment for blade height. The mower blade spindles include a simplified and effective means of retaining tapered roller bearings and include spacers on the spindle shaft for additional blade height adjustment.

The safety of the mower is further enhanced by electric clutches which automatically disengage the mower deck drive belt and the hydraulic vehicle wheel drive if the machine operator leaves the seat of the vehicle. The machine steering, braking, forward and reverse speed are controlled by dual levers. Twin damping means are connected to the control levers resulting in superior control of the machine when passing over rough terrain.

24 Claims, 12 Drawing Figures

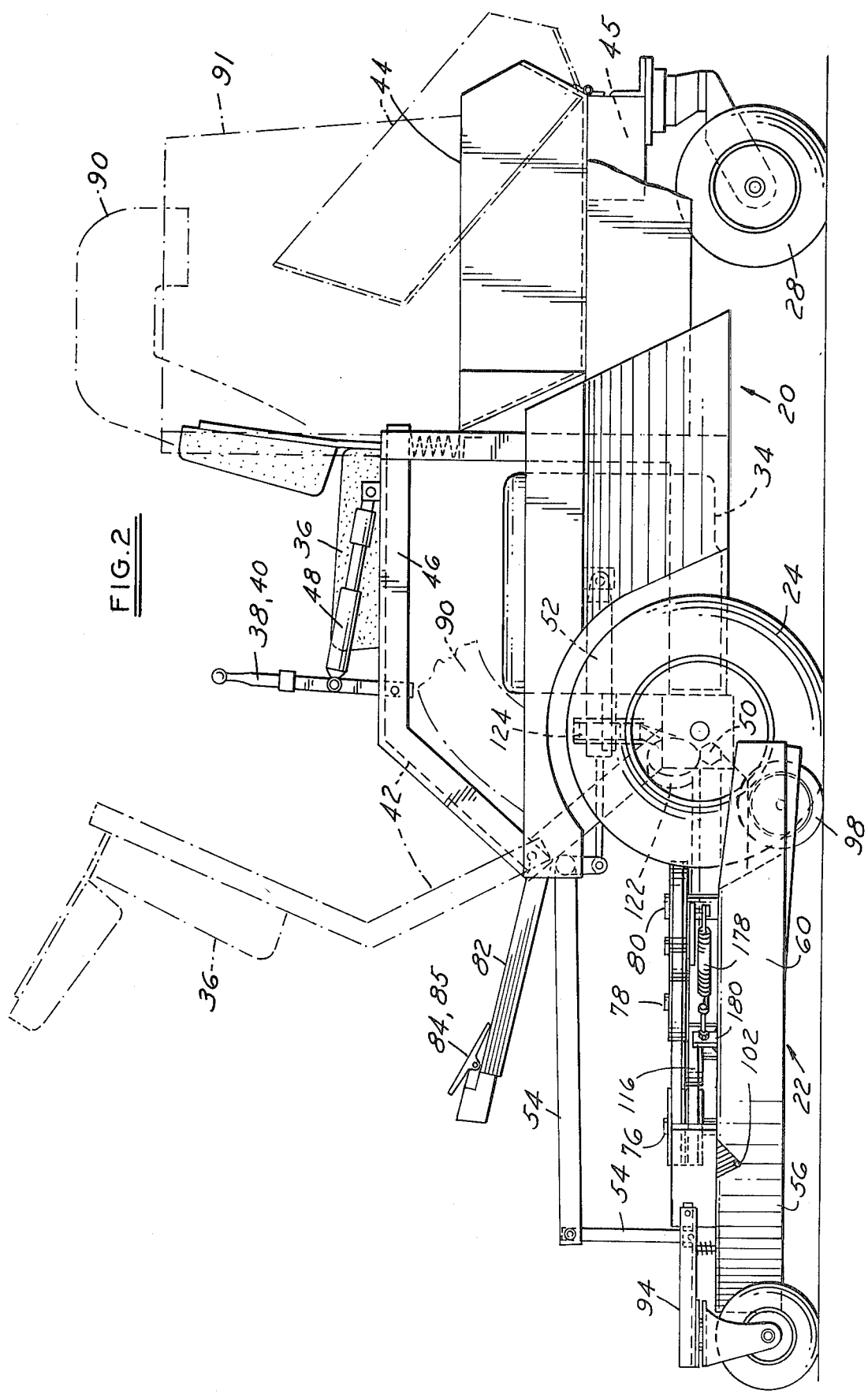

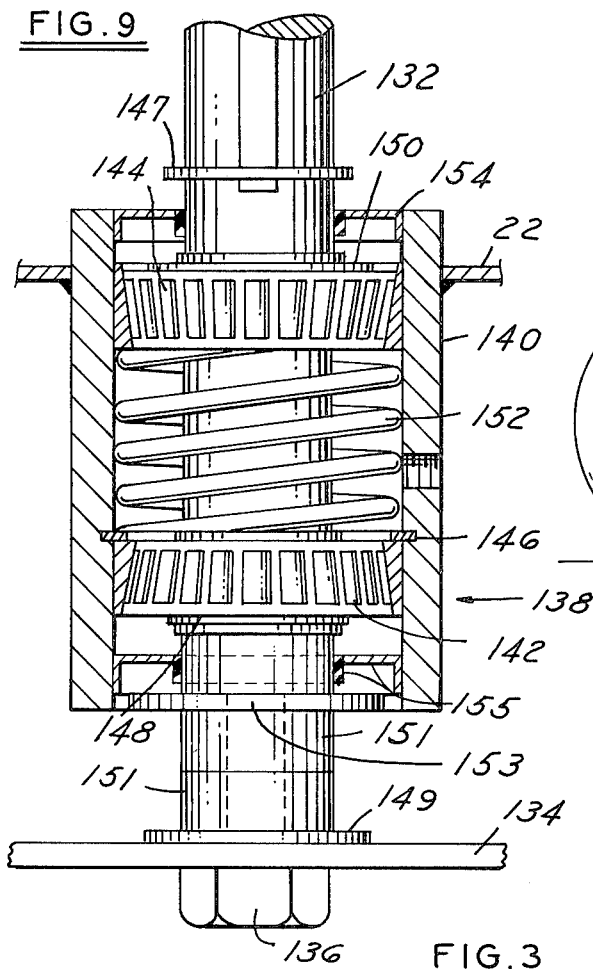
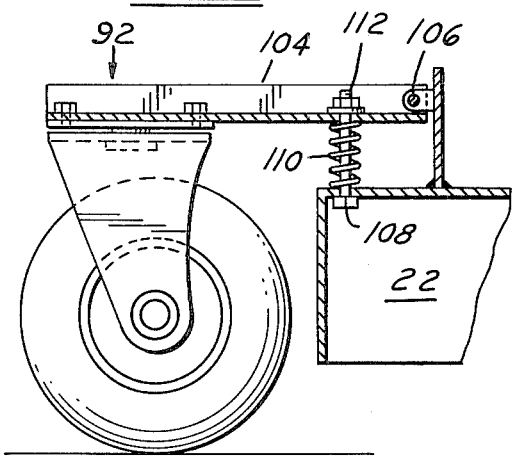
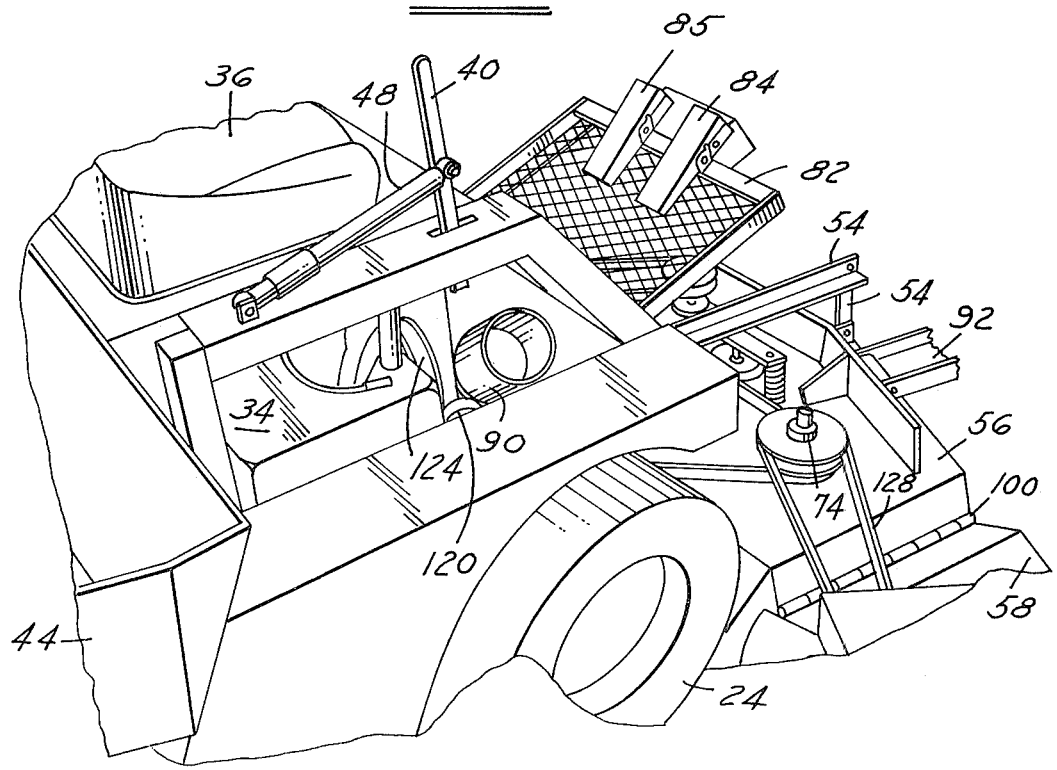

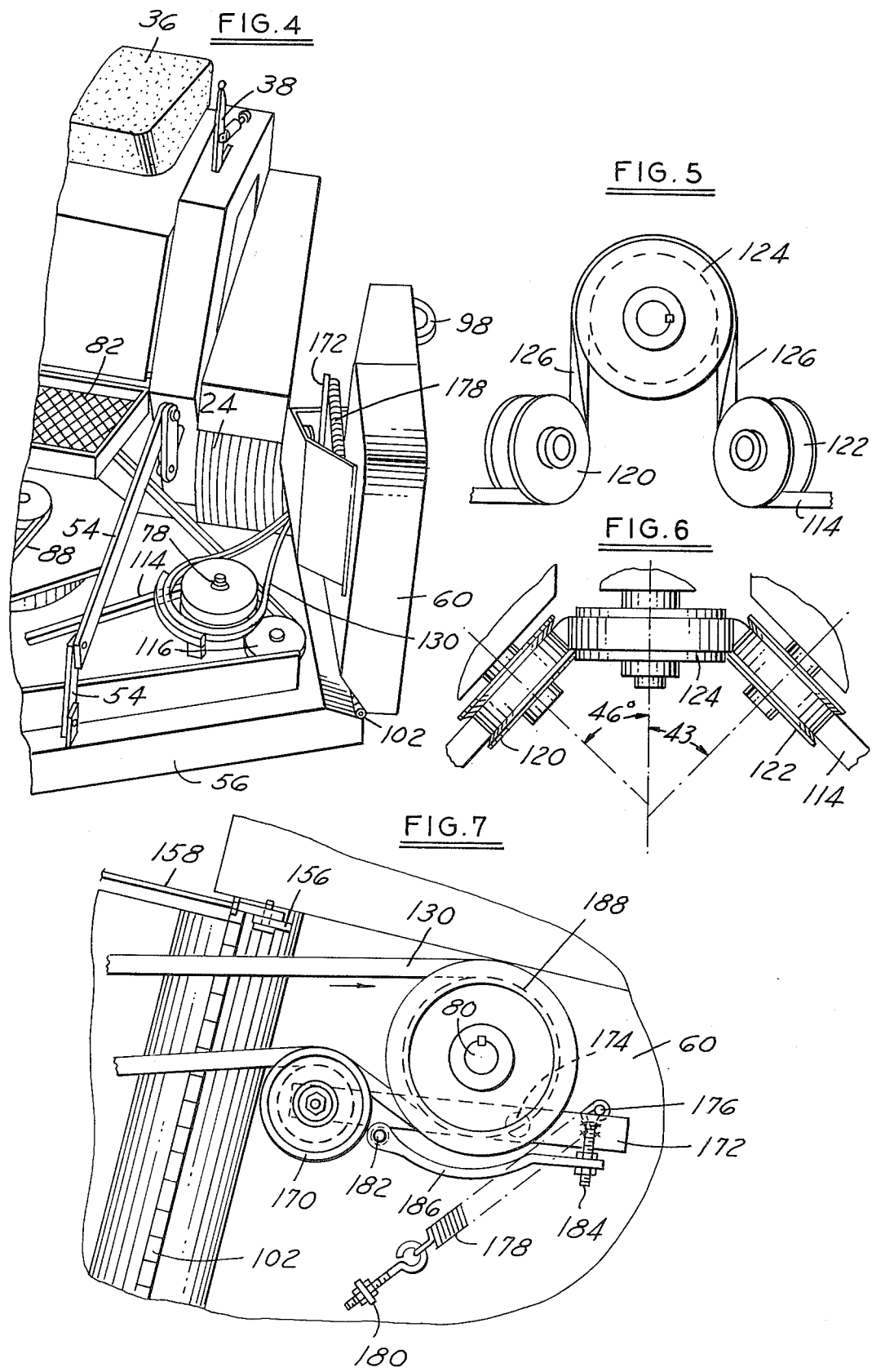

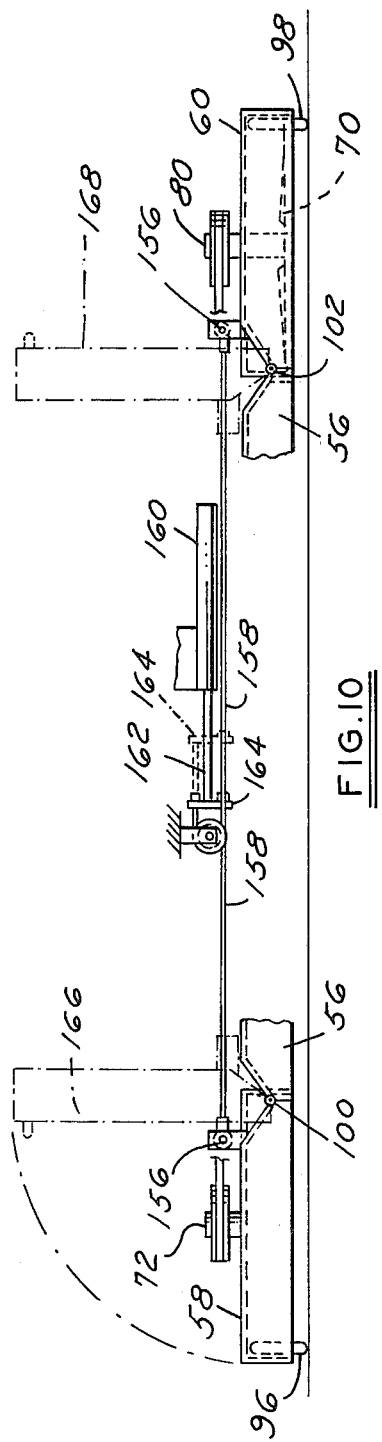
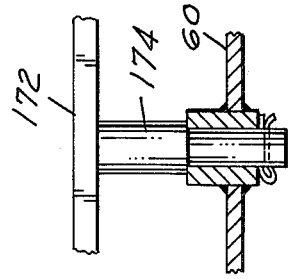
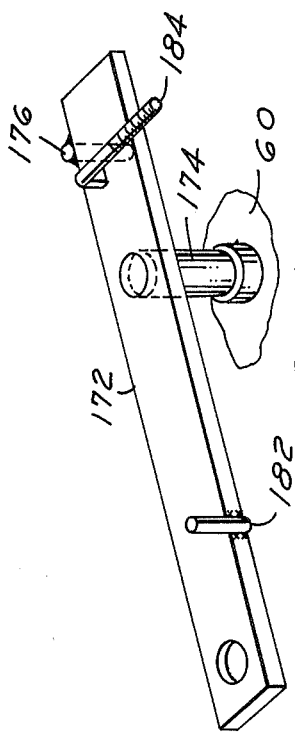

SELF PROPELLED LAWN MOWER

BACKGROUND OF THE INVENTION

The field of the invention pertains to large self propelled lawn mowers and in particular to mowers with front mounted mower decks having a plurality of rotary cutting blades.

Through the years a variety of machines for lawn mowing large expanses of grass evenly and smoothly have been developed. U.S. Pat. Nos. 2,952,961 and 3,116,583 disclose tractor towed mowers for large expanses. U.S. Pat. No. 2,682,740 discloses a self propelled mower for large expanses. Concomitant with the need to mow large expanses economically is the need for good maneuverability and accuracy when trimming about trees, shrubs, gardens and structures. Gangs of mowers towed by a tractor are effective for the former, however, hand or small powered mowers are required for the latter when gang mowers are used. Examples of small self propelled mowers are disclosed in U.S. Pat. Nos. 2,193,712 and 3,152,431. As a result self propelled riding mowers with a central or front mounted deck have been developed. Central or front mounted decks are disclosed in U.S. Pat. Nos. 2,114,096 and 2,134,115, both of which also disclose belt driven multiple blade spindles. These mowers also disclose rotating and counterrotating blades.

To cut a swath substantially wider than the tractor on large expanses and accommodate uneven terrain the mower deck may be divided into hinged sections or wings. U.S. Pat. Nos. 2,952,961 and 3,116,583 illustrate winged sections each having an individual spindle and blade. Although shown here on tractor towed mower decks, such hinged wings are also used on front mounted mower decks.

SUMMARY OF THE INVENTION

The invention comprises an improved hydraulically driven mowing machine for large expanses of grass around apartment complexes, commercial facilities and golf courses. The mower is self propelled with a forward mounted mower deck including a plurality of rotary blades. The blades rotate in opposite directions on opposite sides of the deck to bring the grass clippings to a deck mounted central vacuum. The mower blades are driven by a belt drive to eliminate expensive drive shafts and gearboxes. Applicant's 45° twist belt drive geometry provides increased life to the belt over prior art 90° twist belt drive geometries.

The mower deck side wings at each end of the deck include several novel features. Firstly, a combined clutch and brake mechanism disengages the drive belt to the wing blade spindle and simultaneously brings the blade to a quick stop when the wing is raised beyond its cutting range. The wings may be disengaged without affecting the operation of the central deck mower blades.

The wing deck is attached to the central deck by a depressed hinge substantially close to the elevation of the mower blades. As the mower encounters uneven terrain, the separation of blade cutting paths between the wing blade and the adjacent central blade is substantially prevented despite the movement of the wing relative to the central deck. The depressed hinge also minimizes mower width over conventional hinge means when the wings are in the raised (vertical) position.

The mower deck is equiped with front mounted casters which include a simple adjustment for blade height. The mower blade spindles include a simplified and effective means of retaining tapered roller bearings and include spacers on the spindle shaft for additional blade height adjustment.

In addition to the clutch and brake safety features of the mower deck wings, the safety of the mower is further enhanced by electric clutches which automatically disengage the mower deck drive belt and the hydraulic vehicle wheel drive if the machine operator leaves the seat of the vehicle. The machine steering, braking, forward and reverse speed are controlled by dual levers. To further enhance the operator control of the machine, twin damping means are connected to the control levers resulting in superior control of the machine when passing over rough terrain.

The overall length of the mower is less than the width of the mower with the wings down. With one drive wheel moving forward and the other backward at the same speed, the mower will spin about a vertical axis located approximately where the driver is seated. The circle swept out by the rear of the mower is smaller than that swept out by the mower deck. This feature provides superior maneuverability for cutting about trees, structures and other landscape features. The blades are rotated and located so as to bring the grass clippings adjacent the center blade of the deck. Slightly offset and behind the center blade is a vacuum fan chamber to vacuum up and blow the clippings into a bag mounted behind the driver.

The deck mounted vacuum fan mulches grass clippings and leaves before they are blown through a tube or hose to the bag. The hose passes under the operator thereby eliminating visibility, ingress and egress problems that arise with the side mounted vacuum systems of some prior art mowers. The center mounted vacuum fan also allows close trimming on both sides of the mower. The blades rotate to bring grass clippings to the center mounted vacuum thereby tending to throw objects encountered by the blades inwardly under the machine, an important safety feature. When the vacuum fan is not utilized, the rotational pattern of the blades disperses the grass evenly under the machine.

DESCRIPTION OF THE DRAWINGS

FIG. 2 is a side view of the mower;

FIG. 3 is a perspective partial view of the mower;

FIG. 4 is a perspective partial view of the mower with one wing fully raised;

FIG. 5 is a front view detail of the main belt drive;

FIG. 6 is a top view of the belt drive detail of FIG. 5;

FIG. 7 is a top view detail of the wing clutch and brake mechanism;

FIG. 8 is a side view detail of a mower deck caster;

FIG. 9 is a detail of a blade spindle bearing;

FIG. 10 is a detail of the means for raising the wings simultaneously;

FIG. 11 is a perspective view of the support bar for the wing clutch and brake mechanism; and, FIG. 12 is a detail of the pivot for the support bar of FIG. 11.

DESCRIPTION OF THE PREFERRED EMBODIMENT

Figure 1:
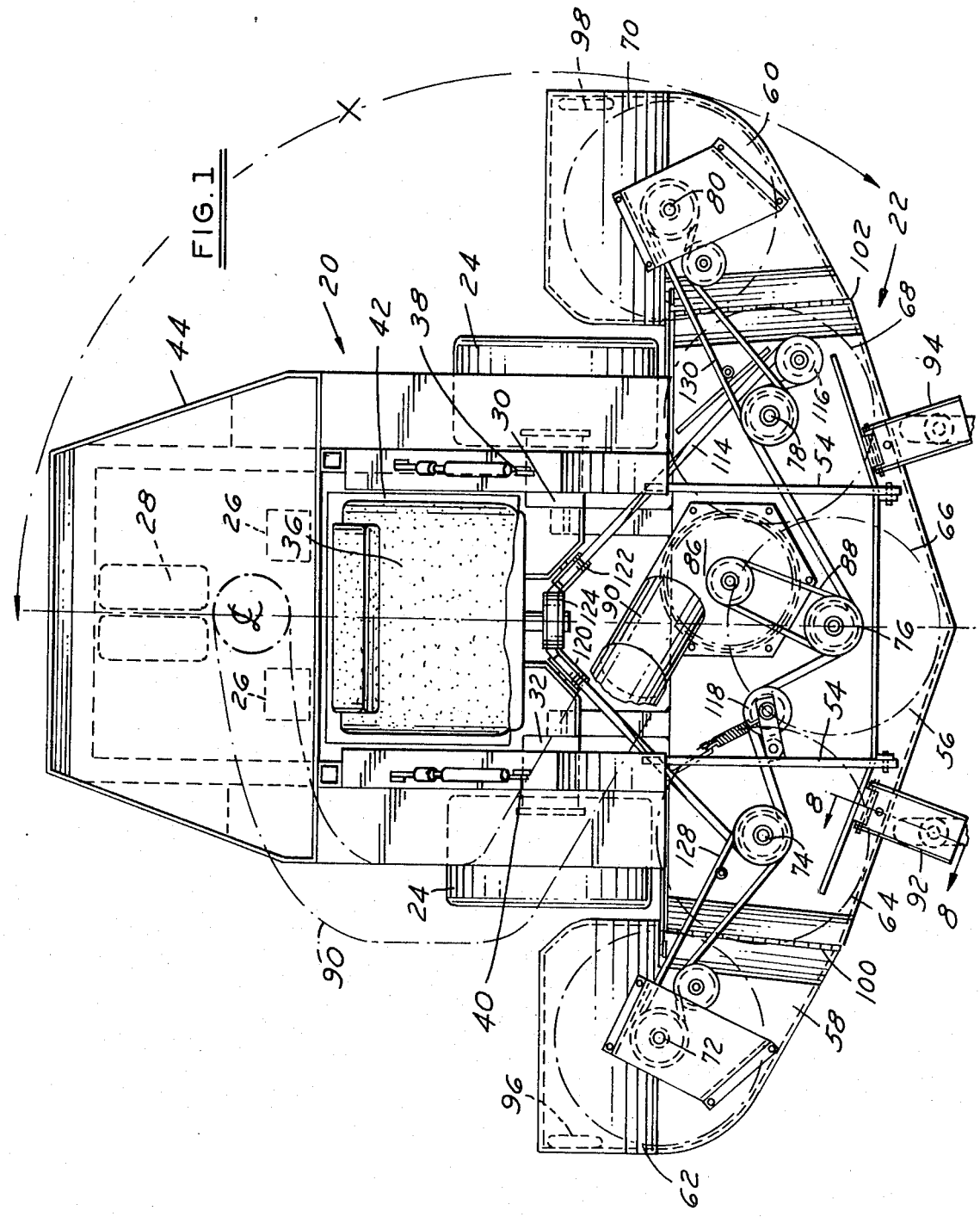
FIG. 1 is a partially broken away top view of the mower.

In FIGS. 1, 2, 3 and 4 the mower comprises a tractor portion generally denoted by 20 and a mower deck generally denoted by 22. The tractor 20 is supported on two drive wheels 24 and a rear mounted dual wheel caster 28 that is free to swivel about a vertical axis at the rear of the tractor. Each of the drive wheels 24 are independently powered by hydraulic motors 30 and 32. Twin hydraulic pumps 26 are driven by an air cooled gasoline engine 34 through an electric clutch to supply hydraulic fluid to the hydraulic motors 30 and 32. The operator of the tractor sits on a seat 36 above the engine 34 and steers by moving levers 38 and 40 to control the flow of fluid to the motors 30 and 32. The levers 38 and 40 also control the forward and reverse speed of the tractor 20.

As shown ghosted in FIG. 2 the seat 36 and seat frame 42 may be raised to provide access to the engine 34 thereunder. At the back of the tractor is a hopper 44 for grass clipping bag support or miscellaneous cargo. The hopper 44 as shown ghosted may be tilted to empty and to provide access to the pumps 26 and tool box 45.

Attached between each lever 38 or 40 and side frame 46 is a damper or shock absorber 48 to stabilize the movement of the levers as the tractor passes over rough terrain. The dampers 48 substantially decrease unwanted jarring movements of the levers 38 and 40 thereby providing smoother control of the tractor and mower deck. The dampers retard sudden reversal of the levers to reduce bucking of the machine and damage of the hydraulic equipment.

The mower deck 22 is pinned to the tractor at 50 and raised and lowered by the hydraulic cylinder 52 actuated linkage 54. The mower deck is divided into a center section 56 and side wings 58 and 60. Five rotary cutters or blades 62, 64, 66, 68 and 70 shown ghosted are suspended below the deck on spindles 72, 74, 76, 78 and 80. The mower deck is shown with the protective belt covers removed to illustrate the belt arrangement. In FIG. 1 the forward portion of the seat frame 42, foot rest 82 and foot pedals 84 and 85 are also not shown. The foot pedals 84 and 85 actuate respectively the hydraulic cylinder 52 to raise the deck 22 and cylinder 160 to raise the wings 58 and 60.

Rotary cutters 62, 64 and 66 rotate counterclockwise from above in FIG. 1 and rotary cutters 68 and 70 rotate clockwise thereby bringing the grass clippings between cutters 66 and 68. A blower or fan 86 is mounted in a chamber in the cental section 56 behind spindle 76 and driven by an auxiliary belt 88 to vacuum up the grass clippings and discharge them through a flexible hose 90 shown ghosted in FIG. 1. The hose leads to a bag 91 shown ghosted in FIG. 2 in the hopper 44.

The center location on the vacuum fan 86 in substantially the center of the central section 56 of the deck 22 provides several advantages in operation of the machine. The fan mulches leaves and grass before their passage through the tube 90 reducing the possibility of clogging in the tube. The central vacuum location permits the machine to trim grass close to obstacles on either side of the machine. Vacuum attachments on prior art machines are located on one wing and interfere with close trimming. The hose 90 exits from under the seat frame 42 as shown best in FIG. 3 preventing interference with the visibility of the operator or his entry or exit to or from the machine. The counterrotational pattern of the blades also throws debri and objects of the center of the machine improving the safety aspect of the machine relative to bystanders and disperses grass clippings more evenly by releasing clippings out of both sides of the mower deck when the fan 86 is not in operation.

As can be seen clearly from FIG. 1 the overall length of the machine is less than the width of the machine with the wings 58 and 60 in mowing position. By reversing one drive wheel at the same speed as the other drive wheel moves forward, the machine will pivot about a vertical axis through the midpoint of a horizontal line joining the rotational axes of the drive wheels. Pivoting the machine about the vertical axis sweeps out a cutting path defined by the trimming edge of the wing as illustrated by the arrow X. Thus, the machine can turn within the cutting path of the wing decks. The shortened design of the machine allows for superior maneuverability compared to conventional zero turn radius mowers.

In the lowered position the forward part of the mower deck 22 is supported by a pair of casters 92 and 94. The wings 58 and 60 are further supported by small wheels 96 and 98 and the depressed hinges 100 and 102. The casters 92 and 94 are shown in detail in FIG. 8 wherein an adjustment as follows is provided to set the cutting height of the mower deck. The caster frame 104 is pinned at 106 to the front of the mower deck 22. A bolt 108 and nut 112 joining the caster frame 104 and the deck 22 prevents the frame from rotating upwardly about the pin 106 when the mower deck 22 rests on the caster. Adjusting the nut downwardly rotates the caster assembly around pin 106 thereby raising the deck 22 relative to the ground in a simple and convenient manner. A spring 110 surrounding the bolt urges the frame 104 against nut 112 when the deck is raised and the caster wheel unloaded. This mounting for the caster will absorb the force of a frontal blow on the caster by permitting the caster frame 104 to rotate around pin 106 and compress spring 110. The mounting protects the caster assembly from damage if the machine accidently strikes a vertical curb or other object.

The three center blade spindles 74, 76 and 78 are driven by a v-ribbed belt 114 such as a "POLY-V" belt manufactured by the Goodyear Tire and Rubber Company. A non-adjustable idler pulley 116 contacting the back of the belt provides for clockwise rotation of spindle 78 as best shown in FIG. 1. An adjustable idler 118 controls belt tension. As detailed in FIGS. 5 and 6 the v-ribbed belt 114 passes under idler pulleys 120 and 122 before passing over main drive pulley 124. Main drive pulley 124 is connected through an electric clutch to the drive shaft of the tractor engine 34. As best shown in FIG. 6 the rotational axes of pulleys 120 and 122 are at approximately 45° from the rotational axis of main drive pulley 124. This "45°" belt twist drive provides superior belt life over the conventional "90°" twist belt drives sometimes used on other machines. The "45°" drive reduces the fatiguing of the belt due to twisting at 126 between the idler pulleys and the main drive pulley. The width of the v-ribbed belt effectively eliminates rolling of the belt common among "90°" twist configurations. The "45°" drive also allows room for the vacuum chamber and fan located in approximately the center of the mower deck. The specific angles 46° and 43° shown in FIG. 6 more accurately align the pulleys 120 and 122 with the peripheries of the spindle 74 pulley and the idler pulley 116 respectively. The wing spindles 72 and 80 are driven by auxiliary belts 128 and 130 from spindle 74 and spindle 78 pulleys respectively.

The two electric clutches on the engine 34, one for the tractor drive train and the other for the mower deck drive train, provide both a safety feature and a convenience feature. Both clutches are disengaged instantly if the operator leaves the seat 36. A manual switch control allows the operator to disengage the mower drive without disengaging the tractor drive. The disengagement of the tractor drive electric clutch allows the engine 34 to be started without any load from the hydraulic pumps, a feature not found on other hydraulic drive mowers and a feature especially beneficial in cold weather with resulting high hydraulic fluid viscosity.

A detail of the cutting blade spindles is shown in FIG. 9. The spindle shaft 132 has a blade 134 attached at the lower end by a bolt 136. The spindle shaft and blade are supported by a bearing assembly generally denoted by 138 having an outer cylindrical shell 140 mounted in the mower deck 22. Inside the assembly are a pair of opposed tapered roller bearings 142 and 144. A shell retaining snap ring 146 retains the outer race of bearing 142 and a shaft mounted snap ring 148 retains the inner race of bearing 142. A second shaft mounted snap ring 150 retains the inner race of bearing 144. The internal spring 152 urges the outer race of bearing 144 upwardly in turn urging the spindle shaft upwardly and thereby taking up any slack and wear in the bearing assembly. Upper and lower seals 154 and 155 are provided to protect the bearing assembly.

The lower seal 155 is reversed in position to permit the insertion of a protective washer 153 seated on the lower end of the shaft 132. The protective washer prevents string and grass from winding up against the seal 155. Below the washer 153 are spacer rings 151 and a blade washer 149 also mounted on the bolt 136. The spacer rings are inserted or deleted as required to determine the height of the blade 134 relative to the mower deck 22. Above the spindle bearing a snap ring 147 is positioned in a groove in the shaft 132 to support the drive pulley (not shown). Spindle bearings in commercial mower decks are a particular source of problems due to high rotational speeds for long periods of time under continuous adverse conditions of moisture, dirt and sudden shock loading. The spindle bearing assembly disclosed above provides an economical means of providing superior spindle bearings.

Referring to FIGS. 3, 4 and 7 the wings 58 and 60 are attached to the central deck portion 56 by depressed hinges 100 and 102. The hinges, depressed from the top of the deck as shown, allow the wings to be tightly folded against the machine as shown in FIG. 4. More importantly, with the wing in mowing position, uneven terrain causes the wing to move upwardly and downwardly relative to the center deck 56. The mowing path swept by the wing cutter 62 or 70 overlaps the path cut by cutter 64 or 68 respectively. As the wing moves upwardly the paths tend to separate and the overlap disappears. The depressed hinge reduces the separation as the wing moves upwardly and a more even cut on rough terrain is produced.

The wings 58 and 60 are free to move up and down with the terrain, however, as illustrated in FIG. 10 a means is provided for the operator to raise or lower both wings simultaneously. Brackets 156 are welded to the wings 58 and 60 and connected to a dual cable linkage 158 in turn actuated by a hydraulic cylinder 160. The hydraulic cylinder 160 is controlled by the machine operator with pedal 85. Actuation of the cylinder piston rod 162 to the ghosted position 164 will raise both wings to the vertical wing positions 166 and 168 also shown ghosted. The depressed hinges 100 and 102 permit the wings 58 and 60 to be more closely folded against the tractor thereby reducing the folded width of the machine by the sum of the depth of each hinge below the deck relative to prior art machines with wing hinges located at the deck surface.

An important safety feature of the mower wing comprises the clutch and brake mechanism for each wing illustrated in FIGS. 4, 7 and 11. In FIG. 7 the wing 60 is shown in mowing position with the belt 130 tightly engaging and driving the spindle pulley and spindle 80. The belt 130 tension is controlled by an idler pulley 170 rotatably mounted on a bar 172 in turn mounted on a support 174. The support 174 is pivotally mounted on the wing 60 deck. The configuration of the bar and the pivotal mounting is shown in FIGS. 11 and 12. A pin 176 welded to the bar 172 engages a spring 178 in turn adjustably attached to the wing 60 deck at 180. Thus, the spring 178 biases the idler pulley 170 into engagement with the belt 130.

Upwardly extending from the bar 172 is a second pin 182 and horizontal threaded rod 184. The pin 182 and rod 184 adjustably support the brake bar 186. When the wing 60 is raised beyond the mowing range the distance between spindle 80 and spindle 78 substantially decreases. As a result the bar 172 pivots clockwise under the urging of spring 178 until brake bar 186 engages the outer flanges of the spindle 80 pulley 188, preventing further clockwise motion of the bar 172. The idler pulley 170 can no longer tightly engage belt 130 and belt 130 slacks off the pulley 188 and the pulley on spindle 78 as shown in FIG. 4. The simultaneous disengagement of the belt 130 and engagement of the brake bar 186 quickly brings the wing spindle 80 and wing cutter 70 to a stop automatically as the wing is raised. The mechanism for wing 58 is a mirror image of the mechanism for wing 60 and operates in the identical manner.

We claim:

1. An improved lawn mower comprising a tractor and a front mounted mower deck attached thereto, an engine in the tractor to provide motive power for the tractor and the mower deck, a plurality of vertically mounted blade spindles in the mower deck each rotatably supporting a cutting blade, a plurality of driven pulleys mounted on the blade spindles and a main drive pulley on the tractor adjacent the front thereof and rotatable about an axis parallel to the longitudinal centerline of the tractor, the drive pulley being driven by the engine, a single main drive belt engaging the main drive pulley and at least two of the blade spindle pulleys on adjacent spindles so as to rotate the spindles in opposite directions, at least two portions of said drive belt extending between the tractor and the mower deck diagonally at approximately 45° from the longitudinal centerline of the tractor and mower deck, and a single idler pulley on each side of said main drive pulley, said idler pulley on each side engaging the single main drive belt and rotatably mounted on the tractor at approximately 45° to the longitudinal centerline of the tractor and mower deck.

2. The mower of claim 1 including a vacuum fan chamber and fan therein mounted in the mower deck at approximately the center thereof and within the area enclosed by the main drive belt.

3. The mower of claim 2 wherein the portions of the main drive belt extending between the tractor and mower deck extend on each side of the vacuum fan chamber.

4. The mower of claims 1, 2 or 3 including a pair of mower deck wings hingedly attached to the opposite sides of the mower deck, the wings each including an auxiliary belt driven blade spindle and pulley thereon.

5. The mower of claim 4 wherein the wing hinged attachment is depressed below the mower deck elevation.

6. The mower of claim 4 including means to disengage the auxiliary drive belt to a wing and brake the wing blade to a stop upon sufficient upward movement of the wing relative to the mower deck and tractor.

7. The mower of claim 6 wherein the disengagement and brake means comprises an idler pulley, means movably urging the idler pulley into engagement with the auxiliary belt and means limiting the further movement of the idler pulley upon sufficient upward movement of the wing.

8. The mower of claim 7 wherein the means limiting the further movement of the idler pulley include the brake means.

9. The mower of claim 6 wherein the disengagement and brake means comprise a bar pivotally attached to the mower wing deck, an idler pulley rotatably mounted on the bar, means attached to the bar movably urging the idler pulley into engagement with the auxiliary drive belt, brake means on the bar engageable with the blade spindle pulley upon sufficient upward movement of the wing, the engagement of the brake serving to limit the further movement of the idler pulley and releasing the tension on the auxiliary drive belt.

10. The mower of claim 4 wherein the wing decks may be rotated at least 90° about the hinges.

11. The mower of claim 1 including a pair of independently rotatable and reversible drive wheels located on a common horizontal transverse axis, said tractor thereby being rotatable about a vertical axis equidistant from the drive wheels and wherein the length of the tractor and mower deck is less than the overall width of the mower deck such that rotation about the vertical axis causes the mower deck to sweep through an arc of greater diameter than the rear of the tractor.

12. The mower of claims 1 or 11 including a pair of levers operable to control the movement of the tractor, each of said levers including damping means to minimize sudden inadvertent movement of the lever.

13. The mower of claim 1 including at least one support caster attached to the mower deck, the attachment comprising a horizontal pivot and a vertical adjustment to determine the elevation of the front of the mower deck, and a spring mounted on the vertical adjustment to cushion impacts against the caster.

14. An improved mower deck for attachment to a tractor comprising a central deck, at least one wing deck hingedly attached to the central deck, a plurality of vertically mounted blade spindles in the mower deck each rotatably supporting a cutting blade, at least one of said spindles being in the wing deck, means engaging the spindles to rotatably drive the spindles, said drive means including a pulley mounted on the wing deck spindle and a drive belt engaging the pulley, means to simultaneously disengage the wing deck drive belt and brake the wing deck spindle to a stop upon sufficient upward movement of the wing deck about the hinged attachment, said disengagement and brake means comprising a bar pivotally attached to the wing deck, an idler pulley rotatably mounted on the bar, means attached to the bar movably urging the idler pulley into engagement with the wing deck drive belt, brake means on the bar engageable with the wing deck spindle pulley upon sufficient upward movement of the wing deck about the hinged attachment, the engagement of the brake serving to limit the further movement of the idler pulley and thereby releasing the tension on the wing deck drive belt.

15. The mower deck of claim 14 wherein the hinged attachment is depressed below the mower deck elevation.

16. The mower deck of claim 15 wherein the wing deck is rotatable upwardly about the hinged attachment substantially 90°.

17. An improved front mounted mower deck for attachment to a tractor comprising a supporting deck, a plurality of vertically mounted blade spindles in the mower deck each rotatably supporting a cutting blade, pulleys mounted on the spindles and a single main drive belt engaging at least two of the pulleys on adjacent spindles so as to rotate the spindles in opposite directions, a vacuum fan chamber and fan therein mounted in the supporting deck at approximately the center thereof and at least partially behind a line joining the two adjacent counterrotating spindles, said vacuum fan chamber thereby located approximately between and partially behind the cutting blades on the two adjacent spindles and within the area enclosed by the main drive belt.

18. The mower deck of claim 17 including a second pulley on at least one of the spindles and an auxiliary belt engaging said second pulley, said auxiliary belt driveably connected to the vacuum fan.

19. The mower deck of claim 17 wherein the cutting blades on one side of the vacuum fan rotate opposite to the cutting blades on the other side of the vacuum fan.

20. The mower deck of claims 17 or 19 wherein the main drive belt comprises a longitudinally v-ribbed belt.

21. The mower deck of claim 20 wherein the back of said v-ribbed belt engages at least one of said spindle pulleys.

22. An improved mower deck for attachment to a tractor comprising a central deck, at least one wing deck attached to the central deck, a plurality of vertically mounted blade spindles in the mower deck each rotatably supporting a cutting blade, at least one of said spindles being in the wing deck, a single hinge attaching the wing deck to the central deck at an elevation substantially below the elevation of the mower deck, said hinge extending substantially from the front to the back of the central deck and located above the plane of the cutting blade, and, said central deck and said wing deck each including a downwardly sloping solid deck panel extending substantially from the front to the back of the central deck and attaching the single hinge to the respective decks.

23. The mower deck of claim 22 wherein the elevation of the hinge is closer to the elevation of the blade paths than to the elevation of the mower deck.

24. The mower deck of claim 23 wherein the wing deck is rotatable at least 90° about the hinged attachment.

* * * * *